United States Patent
Baleine et al.

(10) Patent No.: US 10,983,255 B1
(45) Date of Patent: Apr. 20, 2021

(54) CUSTOMIZING THE REFRACTIVE INDEX OF A SURFACE

(71) Applicants: Lockheed Martin Corporation, Bethesda, MD (US); The Penn State Research Foundation, University Park, PA (US)

(72) Inventors: Clara R. Baleine, Orlando, FL (US); Corey L. Bungay, Ocoee, FL (US); Theresa S. Mayer, Port Matilda, PA (US); Andrew Swisher, State College, PA (US); Jeffrey L. Ruckman, Orlando, FL (US); Stephen R. Tuenge, Eustis Lake, FL (US)

(73) Assignees: Lockheed Martin Corporation, Bethesda, MD (US); The Penn State Research Foundation, University Park, PA (US)

( * ) Notice: Subject to any disclaimer, the term of this patent is extended or adjusted under 35 U.S.C. 154(b) by 696 days.

(21) Appl. No.: 15/373,198

(22) Filed: Dec. 8, 2016

Related U.S. Application Data

(60) Provisional application No. 62/264,531, filed on Dec. 8, 2015.

(51) Int. Cl.
  *G02B 1/118* (2015.01)
  *G02B 1/115* (2015.01)
  *G02B 27/00* (2006.01)

(52) U.S. Cl.
  CPC .............. *G02B 1/118* (2013.01); *G02B 1/115* (2013.01); *G02B 27/0012* (2013.01)

(58) Field of Classification Search
  CPC .......... G02B 1/005; G02B 1/11; G02B 1/115; G02B 1/118; G02B 27/0012; G02B 3/0087; G02B 5/008; G02B 6/02333; G02B 6/02338; G02B 6/02347; G02B 6/02357; G02B 6/02361; G02B 6/0288; G02B 6/107; G02B 6/1226; G02B 6/1245; G02B 6/32; C03B 2203/14; B82Y 10/00; B82Y 20/00; B82Y 35/00; C03C 21/002; G03F 7/2045; Y10T 428/249961; Y10T 428/249969; Y10T 428/249978

(Continued)

(56) References Cited

U.S. PATENT DOCUMENTS

| 6,040,936 A * | 3/2000 | Kim ........................ G02B 5/008 359/245 |
| 7,173,767 B2 | 2/2007 | Satzke |

(Continued)

OTHER PUBLICATIONS

Non-Final Office Action for U.S. Appl. No. 15/373,120, dated Mar. 5, 2020, 15 pages.

(Continued)

*Primary Examiner* — Cara E Rakowski
(74) *Attorney, Agent, or Firm* — Withrow & Terranova, PLLC

(57) ABSTRACT

Mechanisms for customizing a refractive index of an optical component are disclosed. In one example, sub-wavelength openings are formed in a top layer of anti-reflective (AR) material of an optical component to tailor transmission characteristics of the AR material over a range of angles of incidence and a range of wavelengths. In another example, sub-wavelength openings are formed at different filling fractions in the surface of the optical component.

22 Claims, 13 Drawing Sheets

(58) Field of Classification Search
USPC ........ 359/586, 652, 654; 385/123, 124, 125, 385/126; 428/310.5, 312.6, 315.5; 430/5
See application file for complete search history.

(56) References Cited

U.S. PATENT DOCUMENTS

| | | |
|---|---|---|
| 2006/0018594 A1 | 1/2006 | Sugitatsu et al. |
| 2006/0139763 A1* | 6/2006 | Satzke ................... B82Y 20/00 359/652 |
| 2006/0281018 A1 | 12/2006 | Tomaru |
| 2008/0106789 A1 | 5/2008 | Hirai et al. |
| 2013/0170044 A1 | 7/2013 | Mont et al. |
| 2015/0085096 A1 | 3/2015 | Smits |
| 2015/0241603 A1* | 8/2015 | Fujii ..................... G03F 7/0005 359/601 |

OTHER PUBLICATIONS

Non-Final Office Action for U.S. Appl. No. 15/373,120, dated Aug. 9, 2019, 14 pages.
Final Office Action for U.S. Appl. No. 15/373,120, dated Dec. 6, 2019, 18 pages.
Advisory Action and AFCP 2.0 Decision for U.S. Appl. No. 15/373,120, dated Feb. 18, 2020, 4 pages.
Final Office Action for U.S. Appl. No. 15/373,120, dated Sep. 14, 2020, 19 pages.
Advisory Action for U.S. Appl. No. 15/373,120, dated Nov. 18, 2020, 3 pages.
Notice of Allowance and Examiner-Initiated Interview Summary for U.S. Appl. No. 15/373,120, dated Dec. 18, 2020, 13 pages.
Corrected Notice of Allowability for U.S. Appl. No. 15/373,120, dated Jan. 29, 2021, 6 pages.

* cited by examiner

CUSTOMIZING THE REFRACTIVE INDEX OF A SURFACE

RELATED APPLICATION

This application claims the benefit of U.S. Provisional Application No. 62/264,531, filed on Dec. 8, 2015, entitled "SURFACE-ENGINEERED ANTI-REFLECTIVE COATINGS FOR WIDE FIELD OF VIEW AND BROADBAND APPLICATIONS," the disclosure of which is hereby incorporated herein by reference in its entirety.

TECHNICAL FIELD

The embodiments relate to optical components and, in particular, to customizing the refractive index of a surface.

BACKGROUND

Light-sensitive image sensors, such as focal plane arrays, complementary metal oxide semiconductor (CMOS) sensors, charge-coupled device (CCD) sensors, and the like, are often placed behind an optical component, such as a window and/or a lens. Unfortunately, an optical component reflects at least some light. Light that is reflected by an optical component is not transmitted through the optical component, and thus, such reflected light is not sensed by the image sensor. In such applications, it is desirable that reflectivity be minimized so that greater amounts of light reach the image sensor. Reflectance typically increases with the angle of incidence of the light, such that different amounts of light reach the image sensor based on the angle of incidence of the light. Processing components downstream of an image sensor often process the image sensor's data to attempt to compensate for the reflectance, but such compensation algorithms can be complex and require time to execute.

Anti-reflective (AR) coatings are often applied to an optical component to reduce surface reflectivity. However, such coatings have a uniform thickness and a uniform refractive index across the entire surface of the component; therefore, such AR coatings are typically optimized for a middle angular range within a field of view and, thus, offer relatively narrow fields of view. Such AR coatings are also typically designed for a particular wavelength, or for a relatively narrow wavelength band, and thus do not provide low reflective properties over a broadband spectrum. In other applications, an optical component may be designed for multiple wavelength bands with relatively wide angles of incidence, but such optical components typically require relatively complex coatings and/or a relatively large number of layers of AR coatings, resulting in a relatively expensive component and increasing the possibility of delamination.

SUMMARY

The embodiments relate to optical components and, in particular, to customizing the refractive index of a surface. The embodiments include optical components with sub-wavelength openings in the surface of the optical component that form a refractive index at the air/surface interface that reduces reflectance and increases transmittance through the optical component. The embodiments have applicability with optical components that utilize an optical substrate without anti-reflective (AR) materials, as well as optical components that utilize one or more layers of AR materials on the optical substrate. The embodiments have applicability with systems that utilize stationary sensors positioned behind the optical component, as well as systems that utilize sensors that move with respect to the optical component, such as a gimballed system.

In one embodiment, a method for customizing a refractive index of a surface is provided. The method includes applying a top layer of anti-reflective (AR) material over an optical substrate, and forming a plurality of first sub-wavelength openings at a first filling fraction in a first portion of the top layer of AR material to change a native refractive index of the first portion of the top layer of AR material to a first desired refractive index.

In another embodiment, the method further includes determining the first desired refractive index of the first portion of the top layer of AR material for a particular wavelength band of electromagnetic radiation (EMR) and a first angle of incidence of the particular wavelength band of EMR impinging on the top layer of AR material at the first portion of the top layer of AR material, and based on the first desired refractive index, determining the first filling fraction of the plurality of first sub-wavelength openings that alters the first portion of the top layer of AR material to change the native refractive index of the top layer of AR material to the first desired refractive index.

In another embodiment, the method further includes determining the first desired refractive index of the first portion of the top layer of AR material for a particular wavelength band of EMR and a range of angles of incidence of the particular wavelength band of EMR impinging on the top layer of AR material at the first portion of the top layer of AR material, and based on the first desired refractive index, determining the first filling fraction of the plurality of first sub-wavelength openings that alters the first portion of the top layer of AR material to change the native refractive index of the top layer of AR material to the first desired refractive index.

In another embodiment, a system is provided. The system includes an optical component including an optical substrate. The optical component includes a top layer of AR material on the optical substrate having a native refractive index. The top layer of AR material is positioned over the optical substrate and forms a plurality of first sub-wavelength openings at a first filling fraction that alters a first portion of the top layer of AR material to change the native refractive index to a first desired refractive index that differs from the native refractive index.

In another embodiment, another method for customizing a refractive index of a surface is provided. The method includes forming a plurality of first sub-wavelength openings at a first filling fraction in a first portion of a surface of an optical component to change a native refractive index of the surface of the optical component from the native refractive index to a first desired refractive index to alter a transmissivity of the first portion. The method further includes forming a plurality of second sub-wavelength openings at a second filling fraction in a second portion of the surface of the optical component to change the native refractive index of the surface of the optical component from the native refractive index to a second desired refractive index to alter a transmissivity of the second portion.

In another embodiment, a system is provided. The system includes an optical component that includes a surface. The surface includes a first portion that forms a plurality of first sub-wavelength openings at a first filling fraction that changes a native refractive index of the surface to a first desired refractive index to alter a transmissivity of the first portion. The surface also includes a second portion that forms a plurality of second sub-wavelength openings at a second filling fraction that changes the native refractive index of the surface to a second desired refractive index to alter a transmissivity of the second portion.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
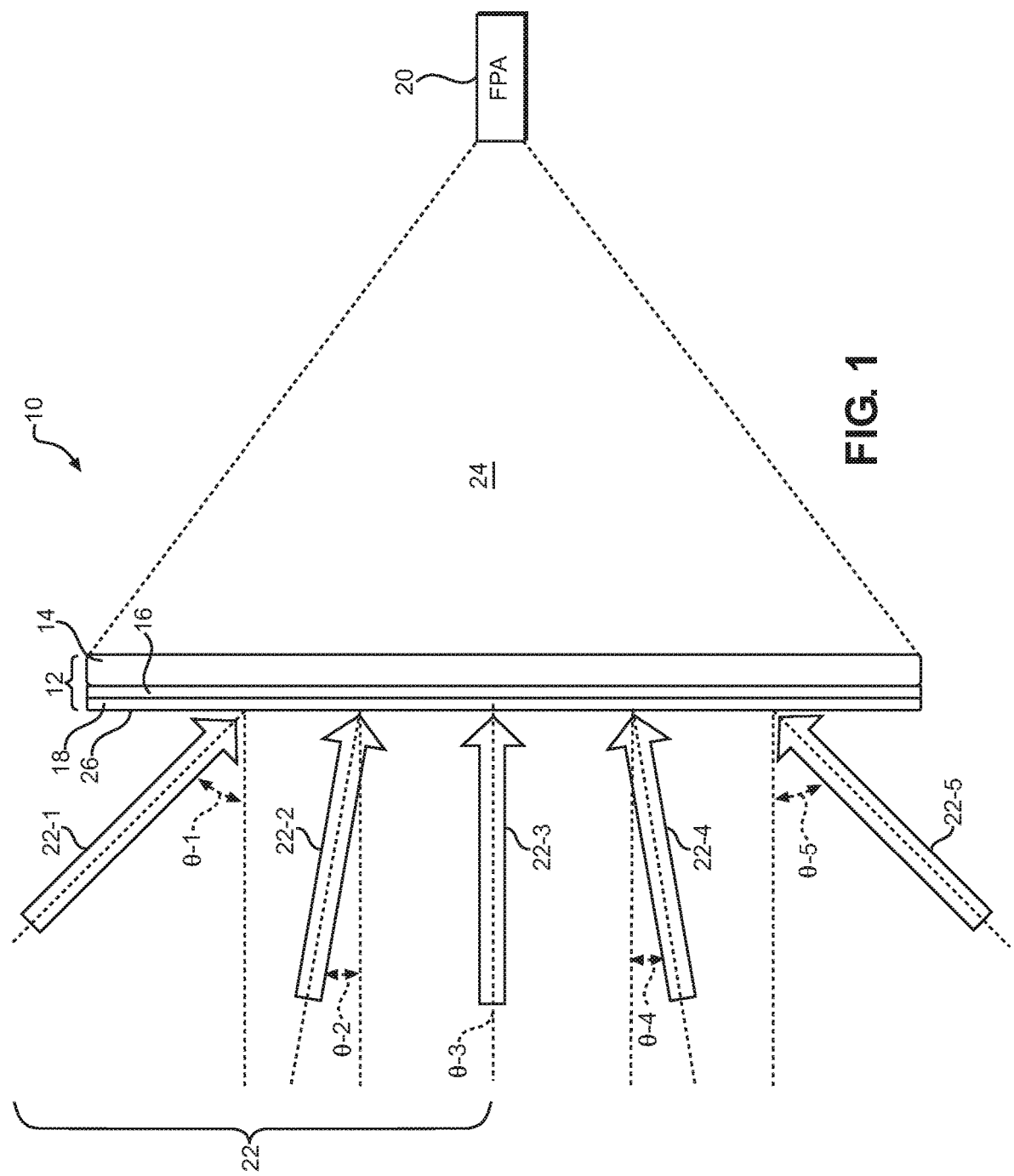
FIG. 1 is a block diagram of a system according to one embodiment.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first layer" and "second layer," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The phrase "surface" as used herein refers to an outermost portion of an item, and includes a thickness of the outermost portion of the item. The precise thickness is generally not relevant to the embodiments, unless otherwise discussed herein. For example, a layer of material has a surface which includes the outermost portion of the layer of material as well as some depth into the layer of material, and the depth may be relatively shallow, or may extend substantially into the layer of material. The sub-wavelength openings discussed herein are formed in the surface, but whether the depth of the sub-wavelength openings extends past the depth of the surface or not is generally not relevant to the embodiments.

The embodiments relate to optical components and, in particular, to customizing the refractive index of a surface. The embodiments include optical components with sub-wavelength openings in the surface of the optical component that change a refractive index at the air/surface interface to reduce reflectance and increase transmittance through the optical component. The embodiments have applicability with optical components that utilize an optical substrate without anti-reflective (AR) materials, as well as optical components that utilize one or more layers of AR materials on the optical substrate. The embodiments have applicability with systems that utilize stationary sensors positioned behind the optical component, as well as systems that utilize sensors that move with respect to the optical component, such as a gimballed system.

Among other advantages, the embodiments facilitate the formation of a refractive index at the air/surface interface of an optical component that minimizes reflectance.

Snell's law describes the relationship between the angle of incidence of light travelling in a first medium having a first index of refraction (sometimes referred to herein as a refractive index) and the angle of refraction of the light in a second medium having a second index of refraction, as the light travels from the first medium to the second medium. Snell's law can be described by the following equation:

$$n_1 \sin \theta_1 = n_2 \sin \theta_2$$

where $\theta_1$ is the angle of incidence, $\theta_2$ is the angle of refraction, $n_1$ is the index of refraction of the first medium, and $n_2$ is the index of refraction of the second medium. Note that the index of refraction of a material varies depending on the wavelength of the light.

The Fresnel equations describe the behavior of light as light moves from a first medium that has a first index of refraction to a second medium that has a second, different, index of refraction. The behavior includes characteristics of reflectance (reflection of the light off the surface of the second medium) and transmission (refraction of light into the second medium). The reflectance of light can differ depending on whether the light is s-polarized light or p-polarized light. The reflectance of s-polarized light ($R_s$) can be determined in accordance with the following equation:

$$R_s = \left|\frac{n_1\cos\theta_i - n_2\cos\theta_t}{n_1\cos\theta_i + n_2\cos\theta_t}\right|^2$$

wherein $\theta_i$ is the angle of incidence of the s-polarized light, $\theta_t$ is the angle of refraction of the s-polarized light, $n_1$ is the index of refraction of the first medium, and $n_2$ is the index of refraction of the second medium.

The reflectance of p-polarized light ($R_p$) can be determined in accordance with the following equation:

$$R_p = \left|\frac{n_1\cos\theta_t - n_2\cos\theta_i}{n_1\cos\theta_t + n_2\cos\theta_i}\right|^2$$

wherein $\theta_i$ is the angle of incidence of the p-polarized light, $\theta_t$ is the angle of refraction of the p-polarized light, $n_1$ is the index of refraction of the first medium, and $n_2$ is the index of refraction of the second medium.

Where the incident light is unpolarized, the reflectance can be determined in accordance with the following formula:

$$R = \frac{1}{2}(R_s + R_p)$$

The Fresnel equations thus identify relationships between indices of refraction of the two mediums, angle of incidence of the light, and the quantity of reflected light versus transmitted light. As noted above, the index of refraction of a material varies depending on the wavelength of the light. Thus, in accordance with Snell's law and the Fresnel equations, altering an index of refraction of a material can alter the transmission characteristics of the material.

In accordance with the Fresnel equations, a same wavelength of light striking different surface portions of a material with a constant refractive index at different angles of incidence will result in different ratios of reflected to transmitted light. Consequently, conventional AR coatings are optimized for light striking the AR coating at a particular incident angle, and a compromise in performance is accepted for light striking the AR coating at higher or lower angles than the optimized incident angle. Greatly differing percentages of transmitted light from different angles of incidence is undesirable in many applications, and it would be preferable in many applications if larger percentages of transmitted light could be obtained at greater angles of incidence, such as, by way of non-limiting example, a 70 degree angle of incidence. However, utilizing an AR coating that has a refractive index optimized for light at, for example, a 70 degree angle of incidence would be less than optimal for other angles of incidence. Moreover, relatively even transmission across a field of view is preferable to greatly differing amounts of transmission based on the angle of incidence of the impinging light.

A pattern of sub-wavelength openings at a particular filling fraction defined by a diameter D of the sub-wavelength openings and a distance L between the sub-wavelength openings formed in the surface of a medium can alter the refractive index of the medium. The phrase "sub-wavelength" refers to opening diameters less than the wavelengths at issue. For example, the examples herein are discussed in the context of wavelengths in the 3 micrometer (μm) (i.e., 3000 nanometers (nm)) to 5 μm (i.e., 5000 nm) range, and thus, sub-wavelength openings refer to openings having a diameter less than 3000 nanometers. In particular, a desired refractive index $n_{eff}$ can be formed in a material by solving for D and L in accordance with the following formula for a hexagonal pattern of sub-wavelength openings:

$$n_{eff} = n_{substrate} + \frac{\pi D^2}{2\sqrt{3} \cdot L^2}(n_{air} - n_{substrate})$$

wherein $n_{air}$ is the refractive index of air (assuming air is the first medium), $n_{substrate}$ is the refractive index of the second medium, D is a diameter of the sub-wavelength openings, and L is a pitch that identifies a distance between the center of the sub-wavelength openings.

FIG. 1 is a block diagram of a system 10 according to one embodiment. The system 10 includes an optical component 12 that comprises an optical substrate 14, a first layer of AR material 16, and a top layer of AR material 18 positioned over the first layer of AR material 16. The phrase "over," as used herein with respect to AR material layers, means that the light impinges on the respective AR material layer prior to impinging on the element that the respective AR material layer is over. For example, in FIG. 1, the top layer of AR material 18 is over the first layer of AR material 16, and the top layer of AR material 18 is over the optical substrate 14. While for purposes of illustration two layers of AR material 16, 18 are illustrated, the embodiments have applicability with any number of layers of AR material, including one layer of AR material or more than two layers of AR material.

The optical substrate 14 may comprise any suitable material, and may be selected based on a particular wavelength, or band of wavelengths for which the system 10 is designed. In this particular example, the optical substrate 14 comprises silicon, but the embodiments are not limited to silicon and have applicability to any optical substrate, including, by way of non-limiting example, sapphire, germanium, Cleartran™ (ZnS), zinc selenide (ZnSe), chalcogenide glasses (e.g., AMTIR-4, AMTIR-5, IRG24), and the like. Similarly, the top layer of AR material 18 may comprise any suitable material suitable for a particular band of wavelengths, and may comprise, by way of non-limiting example, silicon dioxide ($SiO_2$), a material having a relatively low index of refraction, or tantalum pentoxide ($Ta_2O_5$), a material having a relatively high index of refraction. In this example, the top layer of AR material 18 comprises $SiO_2$, and the first layer of AR material 16 comprises $Ta_2O_5$. The use of alternating layers of a high index material with a low index material can increase the overall bandwidth of the optical component 12. It will be appreciated that the particular composition of the AR materials and the number of AR material layers may differ depending on the desired bandwidth or bandwidths of interest and the angles of incidence of interest, and as suitable for impedance matching between the optical substrate 14 and air.

The system 10 also includes an image sensor, in this example a stationary focal plane array (FPA) 20, which is sensitive to light in particular wavelengths. In this example, the FPA 20 comprises a matrix of detector elements that are sensitive to light in a band of mid-wave infrared (MWIR) wavelengths, such as between about 3500 and 5000 nm, but the embodiments are not limited to any particular wavelengths, and have applicability to electromagnetic radiation (EMR) of any wavelengths, including visible, ultraviolet, and IR wavelengths. The FPA 20 may have any desired resolution, such as, by way of non-limiting example, 640×480, 1280×1024, or the like. Note that the use of the phrase "light" as used herein is not limited to visible light, and refers to EMR of any wavelength. The embodiments are generally designed for use in a particular bandwidth of light, referred to herein as the selected band of EMR, and could include, by way non-limiting example, short-wave IR, mid-wave IR, long-wave IR, ultraviolet, visible light, or the like. Such bands may include, but are not limited to a band of wavelengths from 30 μm to 1 mm, from 3 μm to 30 μm, from 700 nm-3 μm, from 400 nm-700 nm, from 200 nm-400 nm, from 1.4 μm to 3 μm, from 3 μm to 8 μm, from 8 μm to 15 μm, and/or from 15 μm to 1000 μm. For purposes of discussion of FIG. 1, the selected band of EMR will be light having a wavelength between about 3500 nm and 5000 nm.

Light in the selected band, in the form of EMR 22-1-22-5 (generally, EMR 22) strikes the surface of the optical component 12. The EMR 22 strikes the surface of the optical component 12 at a plurality of different angles of incidence θ-1-θ-5. The angle of incidence at θ-3 is 0 degrees, which means the EMR 22-3 strikes the optical component 12 perpendicular to the optical component 12. The angles of incidence θ-1, θ-5 may be, for example, +/−70 degrees and the angles of incidence θ-2, θ-4 may be, for example, +/−20 degrees. While for purposes of illustration the EMR 22 is shown impinging on the top layer of AR material 18 at different locations, it will be appreciated that in operation the EMR 22 will impinge on the top layer of AR material 18 at different angles of incidence across the entire surface of the top layer of AR material 18. As illustrated by the Fresnel equation above, the amount of EMR 22-1 that transmits into the AR material 16 differs from the EMR 22-2 and 22-3 because the angles of incidence differ. Although not illustrated, the system 10 may also include an optical system that includes one or more lenses and/or one or more reflectors positioned in the light path between the optical component 12 and the FPA 20 to focus or otherwise manipulate the EMR 22 for delivery to the FPA 20.

In this embodiment, the FPA 20 is stationary with respect to the optical component 12, and a desired refractive index that best suits 1) the selected band of EMR 22, in this example, wavelengths between about 3500 nm and 5000 nm, 2) the desired ½ field of view (FOV) 24 to identify the particular angles of incidence, in this example 0-70 degrees, and 3) the composition of the top layer of AR material 18 is selected. In this example, a desired refractive index of 1.2 is selected. The native refractive index of SiO$_2$ is 1.45. A plurality of sub-wavelength openings is then formed in a surface 26 of the top layer of AR material 18 that alters the native refractive index of the top layer of AR material 18 of 1.45 to the first desired refractive index of 1.2. Mechanisms for determining the diameter and pitch of the sub-wavelength openings are discussed below.

In this example, wherein the optical substrate 14 comprises silicon, the first layer of AR material 16 comprises Ta$_2$O$_5$, and the top layer of AR material 18 comprises SiO$_2$. The optical component 12 has less than 3% averaged reflection across the entire 3.5 to 5 μm spectral waveband range from 0° to 70° angles of incidence (i.e. a 140° field of view). Conventional optical components may require four or more AR material layers to even approach this type of performance. However, each layer of AR material introduces potential delamination issues. Thus, among other advantages, the embodiments minimize the number of AR material layers necessary to achieve both broadband transmission and a wide FOV.

Figure 2:
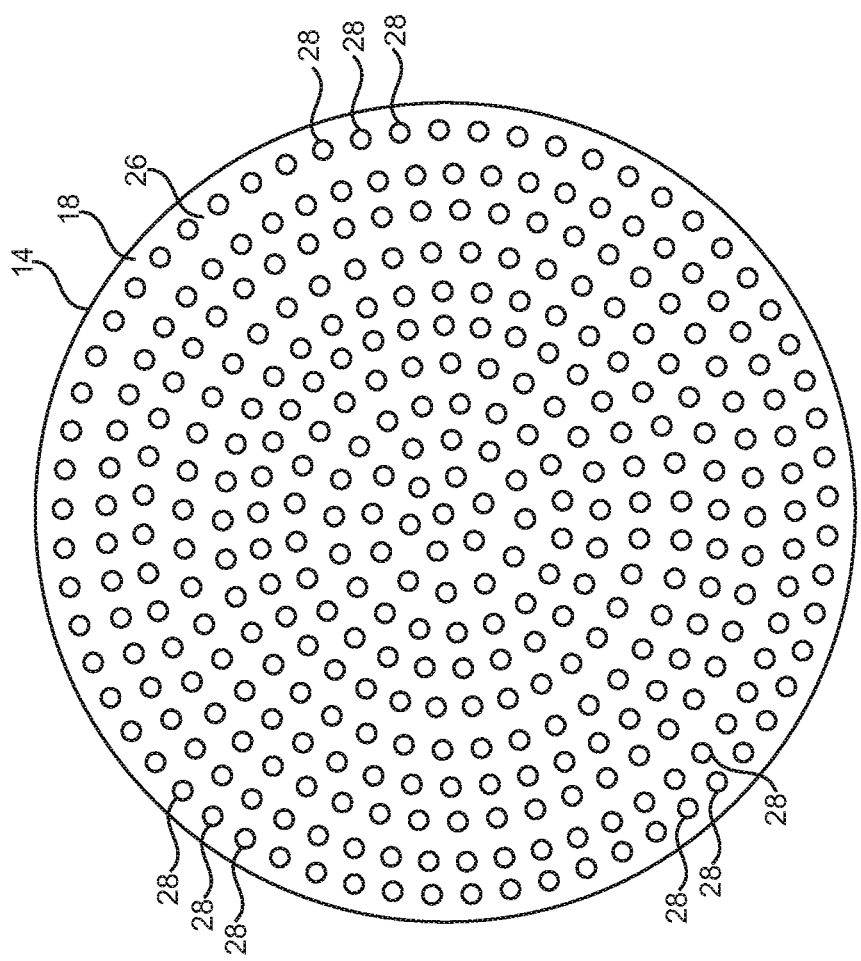
FIG. 2 is a diagram of a plan view of a surface of a top layer of anti-reflective (AR) material in the system illustrated in FIG. 1 according to one embodiment.

FIG. 2 is a diagram of a plan view of the surface 26 of the top layer of AR material 18 according to one embodiment. A plurality of sub-wavelength openings 28 are formed in the surface 26 to alter the native refractive index of the top layer of AR material 18 to the first desired refractive index of 1.2. In this example, the dimensions of the sub-wavelength openings 28 are 325 nm diameter with a pitch (i.e., a distance between centers of the sub-wavelength openings 28) of 414 nm, providing a refractive index of 1.2. In one embodiment, the sub-wavelength openings 28 are formed by directing a beam of energy at the surface 26 to imprint a mask of the sub-wavelength openings 28, although the embodiments are not limited to any particular mechanism of imprinting a mask.

The beam of energy may comprise, by way of non-limiting example, an ion beam, e-beam lithography, or a laser beam. A subsequent chemical or physical etching processing step may then be performed to form the sub-wavelength openings 28 in accordance with the mask.

Figure 3:
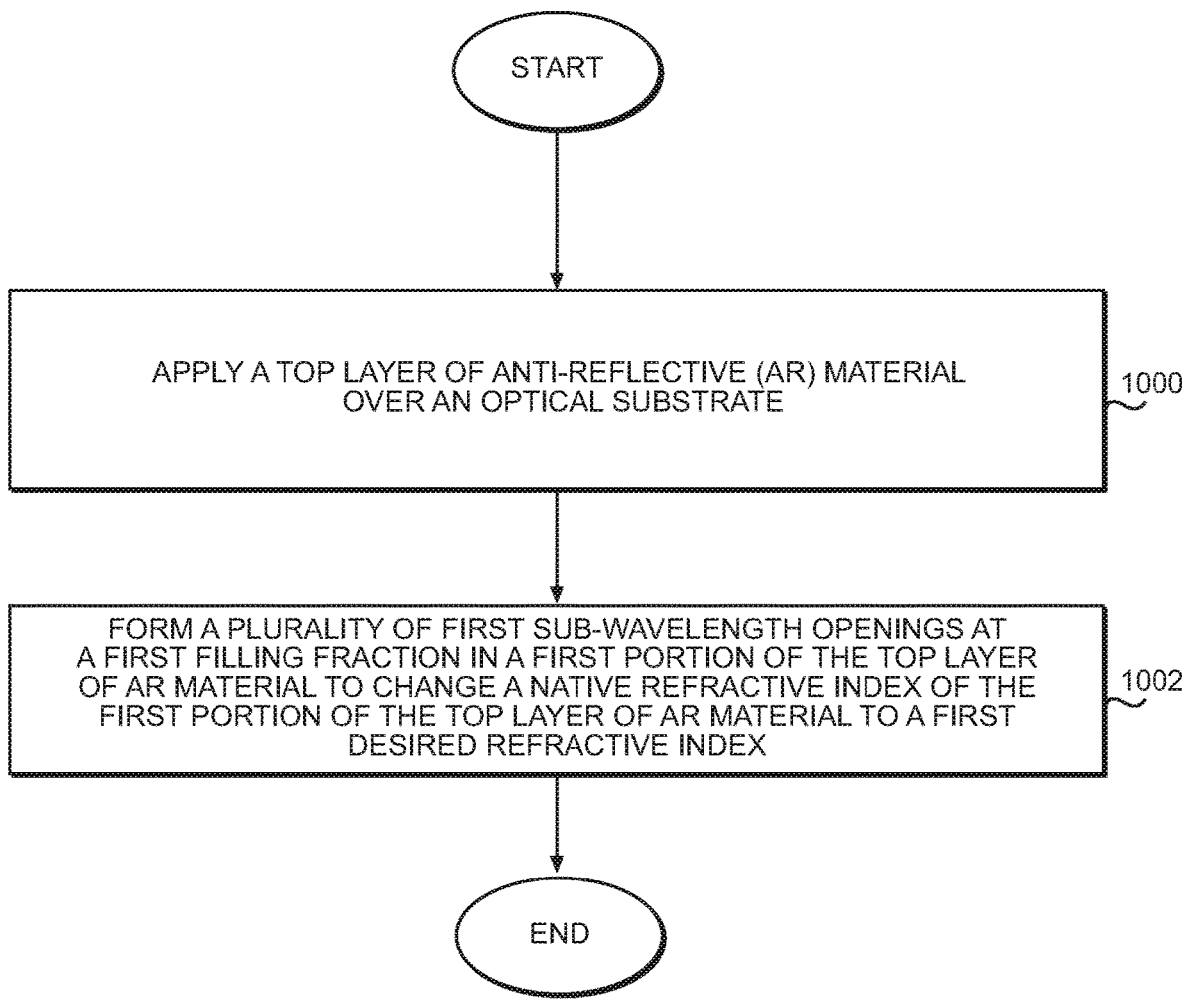
FIG. 3 is a flowchart of a method for customizing a refractive index of the surface according to one embodiment.

FIG. 3 is a flowchart of a method for customizing a refractive index of a surface according to one embodiment. Initially, a top layer of AR material, in this example, tantalum pentoxide (Ta$_2$O$_5$), is applied over the optical substrate 14 (FIG. 3, block 1000). In this example, where there is only one layer of AR material, the top layer of AR material is applied directly on the optical substrate 14, but in other examples, the top layer of AR material may be applied over the optical substrate over one or more previous layers of AR material. A plurality of sub-wavelength openings at a filling fraction are formed in a first portion of the top layer of AR material to change a native refractive index of the first portion of the top layer of AR material to a first desired refractive index (FIG. 3, block 1002).

The diameter and pitch of the sub-wavelength openings result in a particular filling fraction of air to material in the surface of the top layer of AR material that alters the native refractive index of the top layer of AR material to the desired refractive index. In one embodiment, the following formula may be utilized to determine a diameter D of the openings and an opening pitch L between a center of the openings:

$$n_{\mathit{eff}} = n_{low} + \frac{\pi D^2}{2\sqrt{3}\, L^2}(n_{air} - n_{low})$$

wherein n$_{\mathit{eff}}$ is the desired refractive index, n$_{low}$ is the refractive index of the top layer of AR material, and n$_{air}$ is the refractive index of air.

Figure 4:
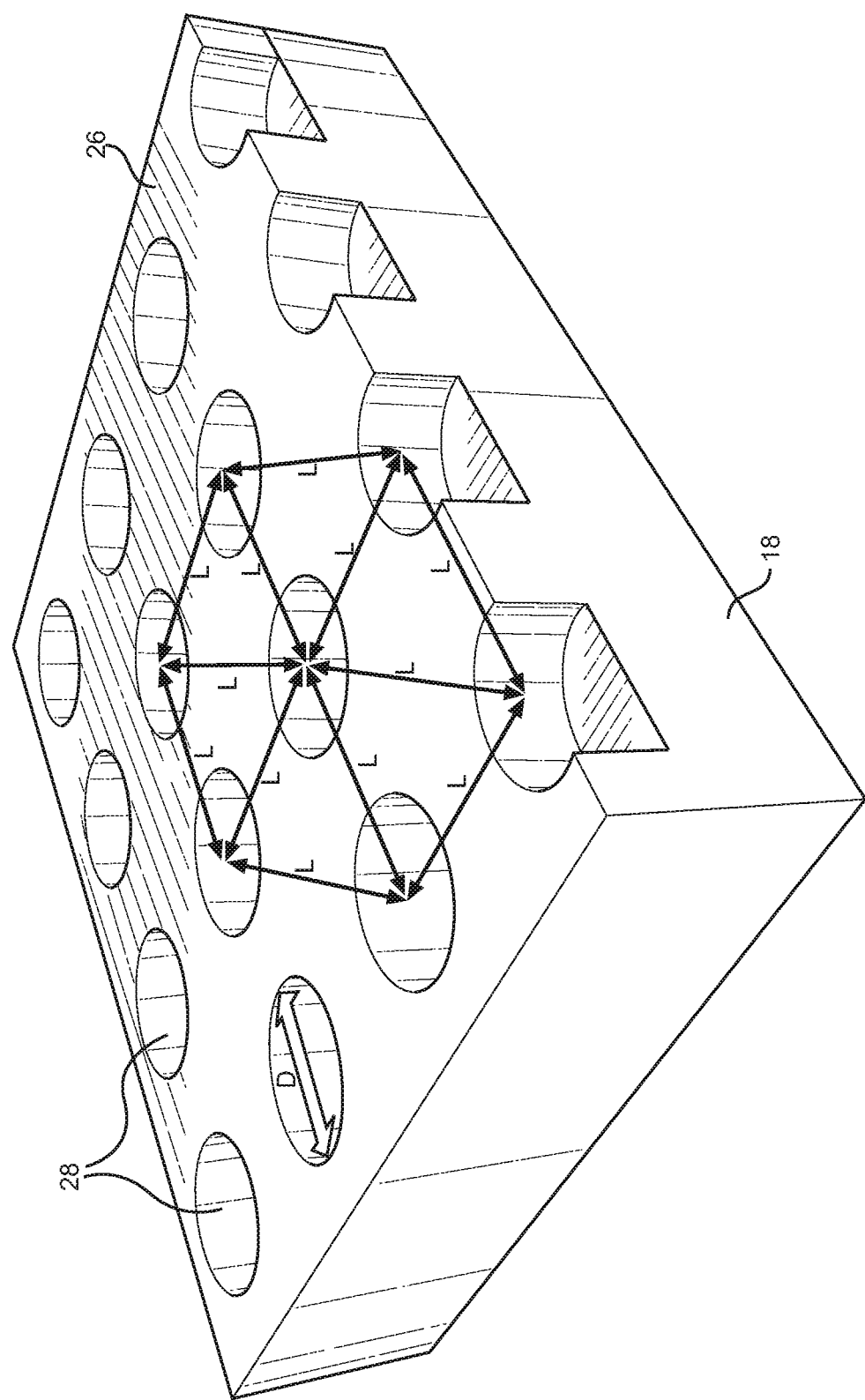
FIG. 4 is a diagram illustrating a portion of a surface of a top layer of AR material according to one embodiment.

FIG. 4 is a diagram illustrating a portion of the surface 26 of the top layer of AR material 18 illustrated in FIG. 2. The surface 26 includes a plurality of the subwavelength openings 28 arranged in a hexagonal pattern. While for purposes of illustration a hexagonal pattern is illustrated, it will be apparent that other patterns that result in the same filling fraction may be utilized.

Figure 5:
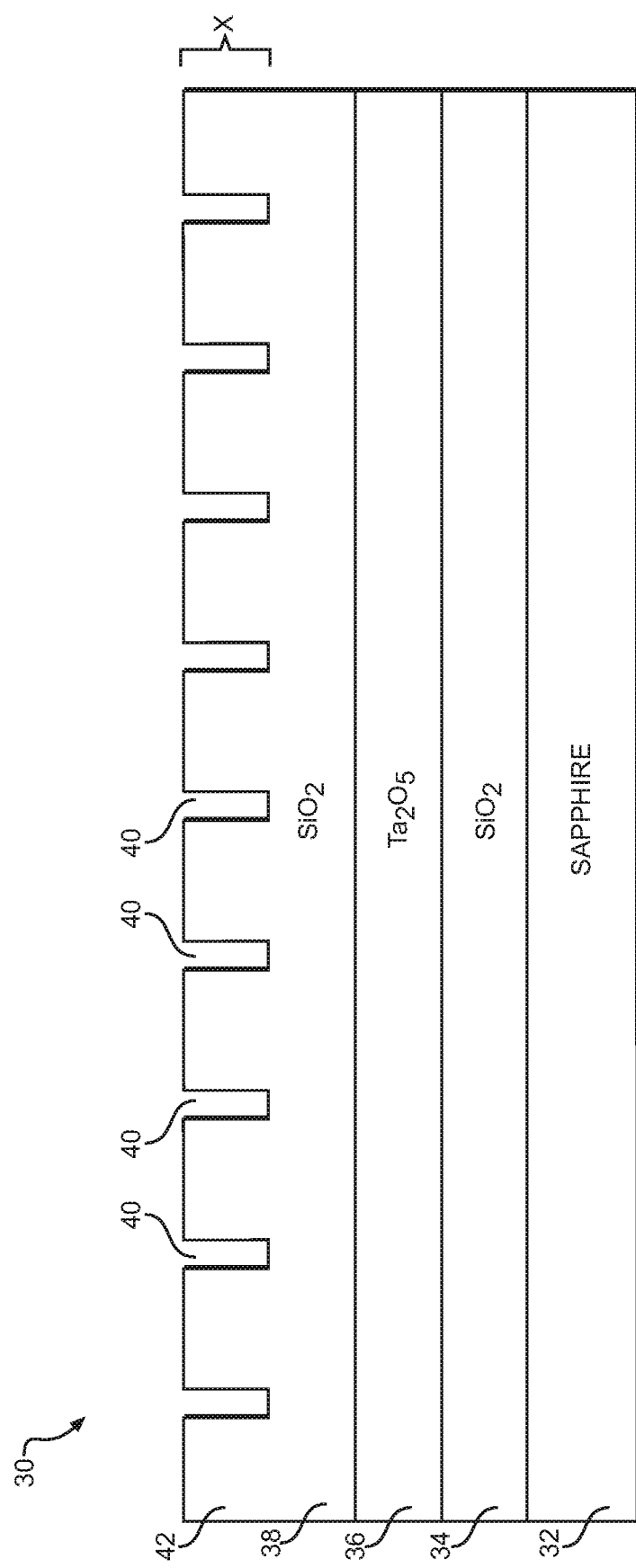
FIG. 5 is a block diagram of an optical component according to another embodiment.

FIG. 5 is a block diagram of an optical component 30 according to another embodiment. The optical component 30 includes an optical substrate 32, which in this example comprises sapphire, a first layer of AR material 34, a second layer of AR material 36, and a third layer of AR material 38. The first layer of AR material 34 comprises a low-index material, silicon dioxide, the second layer of AR material 36 comprises a high-index material, tantalum pentoxide, and the third layer of AR material 38 comprises a low-index material, silicon dioxide. A plurality of sub-wavelength openings 40 are formed at a filling fraction in the third layer of AR material 38 that alters a native refractive index of a surface 42 to a first desired refractive index. The plurality of sub-wavelength openings 40 are referred to as layer X below, but are formed in the third layer of AR material 38.

Note that in other embodiments, particular low-index AR material layers and high-index AR material layers may be selected based on particular wavelength bands of interest. Moreover, while three AR material layers are illustrated herein, fewer or greater than three AR material layers may be utilized.

Table 1 identifies the refractive indices of the various relevant materials.

TABLE 1

| MATERIAL | REFRACTIVE INDEX AT 1 MICROMETER |
|---|---|
| $SiO_2$ (low) | 1.45 |
| $Ta_2O_5$ (high) | 2.09 |
| Sapphire | 1.76 |

Table 2 illustrates setup data provided to a process for determining the refractive index prescription for the optical component 30 according to one embodiment. Table 2 identifies the various media that the light will travel through, including air, sapphire ($Al_2O_3$), $Ta_2O_5$, and $SiO_2$. The fourth layer X refers to the layer of sub-wavelength features and is initially unknown. The setup data from Table 2 is provided to a suitable calculation function that, given a desired refractive index $n_{eff}$, computes the various thicknesses of each of the AR material layers 34, 36, 38 and Layer X.

TABLE 2

| Setup/Film Indices | | | | |
|---|---|---|---|---|
| SYMBOL | TYPE | DISPERSION | A(n) | B(k) |
| AIR | | AIR | | |
| SUB | | $Al_2O_3$ | | |
| H | Opt | $TA_2O_5$ | | |
| L | Opt | $SiO_2$ | | |
| X | Opt | $N | | |

Given the optical substrate 32 and the AR material layers 34, 36, 38, examples of various thicknesses, including the depth of the sub-wavelength openings 40 in the AR material layer 38, are identified in Table 3 for various desired refractive indices ($n_{eff}$) ranging from 1.2–1.55.

by way of non-limiting example, COMSOL Multiphysics® software available from COMSOL, Inc., 100 District Avenue, Burlington, Mass. 01803. The desired refractive index $n_{eff}$, in part, may be based on one or more angles of incidence of EMR. For example, where a system has a relatively wide field of view of 140 degrees, the range of relevant angles of incidence would be between 0 degrees and 70 degrees, and the desired refractive index $n_{eff}$ may be based in part on simulations that identify the best transmission characteristics over the 70 degree range of angles of incidence in conjunction with the particular waveband of interest.

For purposes of discussion, assume that a desired refractive index $n_{eff}$ of 1.2 is selected. The leftmost column of Table 2 identifies the desired material layer thicknesses for a desired refractive index $n_{eff}$ of 1.2. In one embodiment, the following formula may be utilized to determine a diameter D of sub-wavelength openings and an opening pitch L of the openings, to determine a filling fraction L/D:

$$n_{eff} = n_{low} + \frac{\pi D^2}{2\sqrt{3}\, L^2}(n_{air} - n_{low})$$

wherein $n_{eff}$ is the desired refractive index (in this example, 1.2), $n_{low}$ is the refractive index of the low-index third layer of AR material 38 (in this example $SiO_2$), and $n_{air}$ is the refractive index of air. In this example, the filling fraction L/D=414/325. Note that it is the fraction that is relevant, not necessarily the particular L or D. Thus, in the example illustrated in FIG. 5, a D of 325 was selected, and thus L=414. Note that so long as the ratio (filling fraction) remains substantially the same, the diameter D and pitch L can be varied in accordance with fabrication limitations, such as may occur based on the composition of the substrate, or due to optical aberrations, such as diffraction, which may occur with certain diameters and pitches.

Table 4 identifies the actual thicknesses of each of the AR material layers 34, 36, 38, and the depth of the sub-wavelength openings 40 (X). Note that the thicknesses in Table 4 are expressed in absolute, rather than optical, thicknesses.

TABLE 3

| $n_x$ = 1.20 | $n_x$ = 1.25 | $n_x$ = 1.30 | $n_x$ = 1.35 | $n_x$ = 1.4 | $n_x$ = 1.45 | $n_x$ = 1.50 | $n_x$ = 1.55 |
|---|---|---|---|---|---|---|---|
| .09241L | .104L | .11414L | .12488L | .13524L | .14444L | .15699L | .146L |
| .09519H | .09017H | .08078H | .07454H | .07096H | .06783H | .0465H | .04885H |
| .52118L | .52985L | .53291L | .54031L | .55502L | .94293L | .86555L | .89795L |
| 1.57676X | 1.52207X | 1.46869X | 1.43875X | 1.42755X | 1.06002X | .85411X | .83922X |

Note that the thicknesses identified in Table 3 are optical thicknesses rather than absolute thicknesses. One such suitable calculation function to determine the data in Table 3 is FilmStar Optical Thin Film Software, available from FTG Software Associates, Princeton, N.J., but the embodiments are not limited to any particular calculation function. In order to determine a desired refractive index $n_{eff}$, simulations may be run to identify differences in transmittance performance between the various desired refractive indices ($n_{eff}$). Any suitable simulation software may be utilized, such as,

TABLE 4

| LAYER | THICKNESS |
|---|---|
| X (SUB-WAVELENGTH OPENINGS 40) | 1.0512 MICROMETERS |
| AR MATERIAL 38 | 0.2869 MICROMETERS |
| AR MATERIAL 36 | 0.0353 MICROMETERS |
| AR MATERIAL 34 | 0.0509 MICROMETERS |

Thus, in this example, the sub-wavelength openings 40 are 1.05 micrometers deep, 400 nanometers in diameter, and spaced 510 nanometers apart, center to center.

Figure 6:
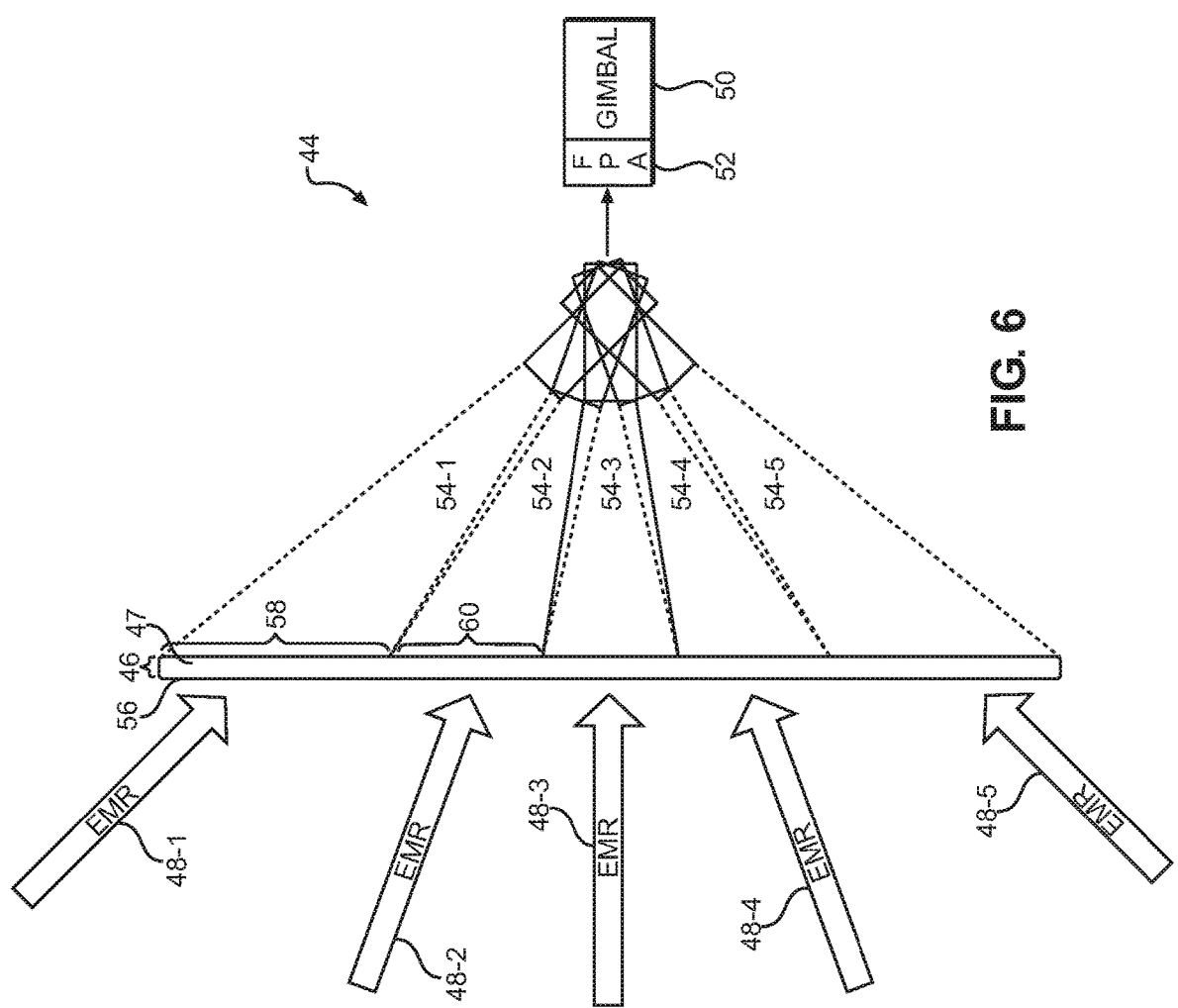
FIG. 6 is a diagram of a system according to another embodiment.

FIG. 6 is a diagram of a system 44 according to another embodiment. The system 44 is substantially similar to the system 10 discussed above except as otherwise discussed herein. In this embodiment, the system 44 includes an optical component 46 which includes an optical substrate 47 that receives EMR 48-1-48-5 (generally, EMR 48) at various angles of incidence. The optical component 46 may or may not include one or more layers of AR material. In this embodiment, a gimbal 50 moves an FPA 52 with respect to the optical component 46 such that the FPA 52 looks through the optical component 46 at a variety of different FOVs 54-1-54-5 (generally, FOVs 54). In some examples, this may be referred to as a stop-and-stare system, wherein the gimbal 50 moves the FPA 52 with respect to a portion of the optical component 46, and the FPA 52 collects EMR 48 from that particular FOV 54. The gimbal 50 then moves the FPA 52 with respect to another portion of the optical component 46 and the FPA 52 collects EMR 48 from that particular FOV 54. The FOVs 54 are substantially smaller than the FOV illustrated in the system 10. The phrase "moves the FPA 52 with respect to a portion of the optical component 46" means that the gimbal 50 may physically move the FPA 52, or may use reflectors to switch which FOV 54 is impinging on a stationary FPA 52 at any given time.

In this example, the optical component 46 includes a surface 56 that has a first portion 58 that forms a plurality of first sub-wavelength openings at a first filling fraction that alters a native refractive index of the surface 56 to a first desired refractive index. The first desired refractive index is determined based on the refractive index that would provide the desired transmission characteristics of the EMR 48-1 within the FOV 54-1, given the angle, or angles, of incidence of the EMR 48-1 of interest with respect to the surface 56. Such desired transmission characteristics, for example, may be the refractive index that provides the most even transmission across a range of angles of incidence of interest given the particular FOV 54-1. The surface 56 also has a second portion 60 that forms a plurality of second sub-wavelength openings at a second filling fraction that alters the native refractive index of the surface 56 to a second desired refractive index. The second desired refractive index is determined based the refractive index that would provide the desired transmission characteristics of the EMR 48-2 within the FOV 54-2, given the angle, or range of angles of incidence of the EMR 48-2 with respect to the surface 56, given the particular FOV 54-2.

Figure 7:
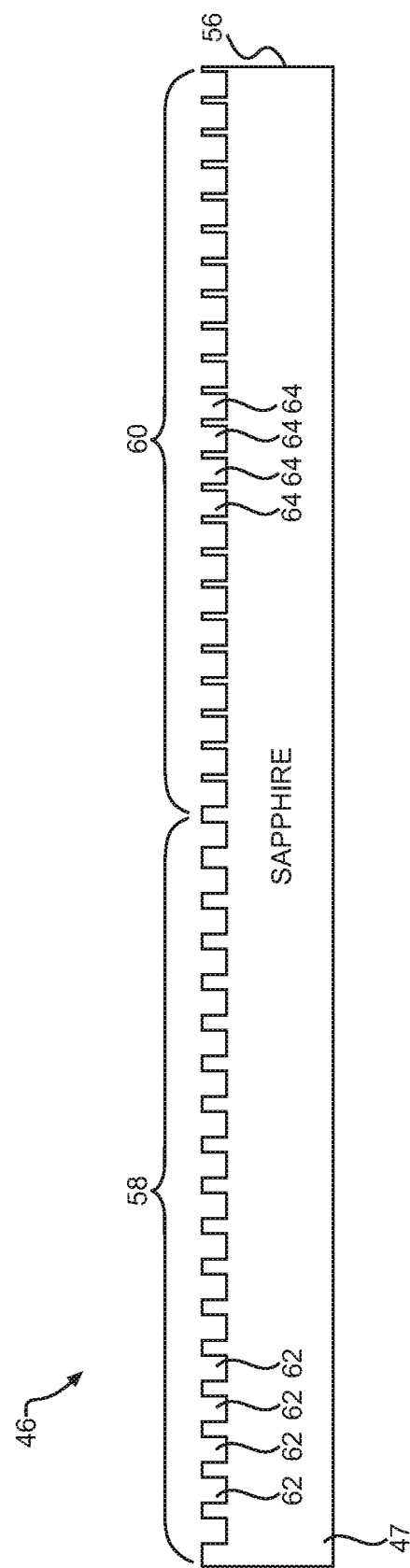
FIG. 7 is a diagram of a cross-section of a portion of an optical substrate illustrated in FIG. 6 according to one embodiment.

FIG. 7 is a diagram of a cross-section of a portion of the optical substrate 47 illustrated in FIG. 6 according to one embodiment. The optical substrate 47 includes the surface 56 that has the first portion 58 that forms a plurality of first sub-wavelength openings 62 at a first filling fraction that alters a native refractive index of the surface 56 to a first desired refractive index. The surface 56 also has the second portion 60 that forms a plurality of second sub-wavelength openings 64 at a second filling fraction that alters the native refractive index of the surface 56 to a second desired refractive index. In this example, the diameter and depth of the first sub-wavelength openings 62 and the second sub-wavelength openings 64 may be identical, however the pitch between the first sub-wavelength openings 62 differs from the pitch between the second sub-wavelength openings 64.

Figure 8:
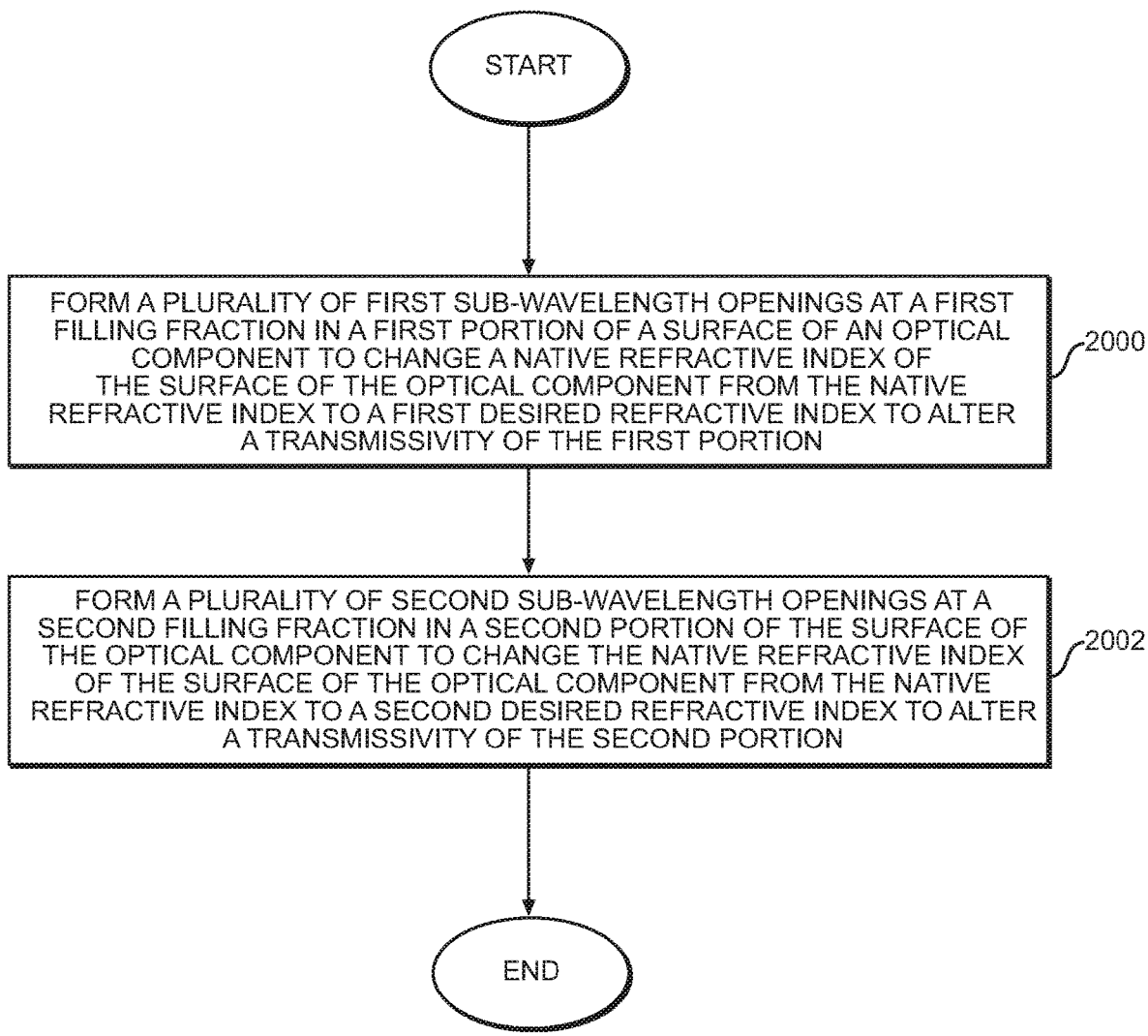
FIG. 8 is flowchart of a method for customizing a refractive index of a surface according to one example.

FIG. 8 is flowchart of a method for customizing a refractive index of a surface according to one example. FIG. 8 will be discussed in conjunction with FIGS. 6 and 7. The plurality of first sub-wavelength openings 62 at a first filling fraction are formed in the first portion 58 of the surface 56 of the optical component 46 to change a native refractive index of the surface 56 of the optical component 46 from the native refractive index to a first desired refractive index to alter a transmissivity of the first portion 58 (FIG. 8, block 2000). In particular, in some examples, transmissivity of the first portion 58 is altered to ensure a relatively constant transmissivity across the first portion 58 for the relevant angles of incidence, such as a transmissivity that varies less than 20%, or a transmissivity that varies less than 10%, or a transmissivity that varies less than 5%, or any percentage between 1% and 4%. The plurality of second sub-wavelength openings 64 are formed at a second filling fraction in the second portion 60 of the surface 56 of the optical component 46 to change the native refractive index of the surface 56 of the optical component 46 from the native refractive index to a second desired refractive index to alter a transmissivity of the second portion 60 (FIG. 8, block 2002).

Figure 9:
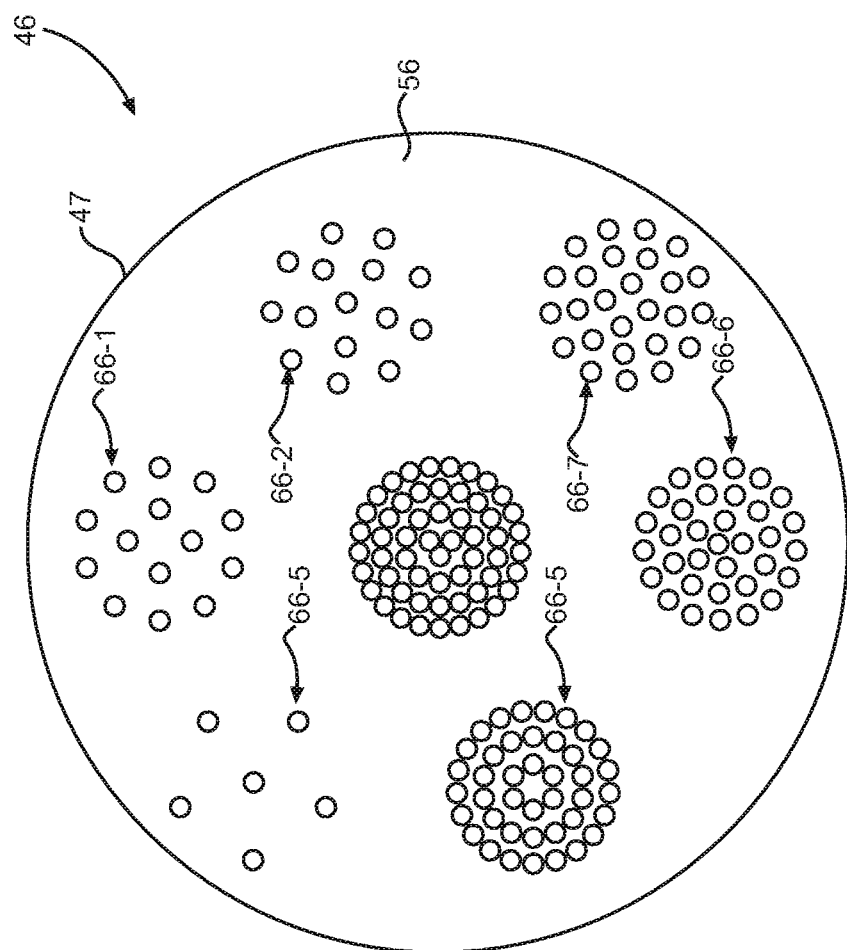
FIG. 9 is a diagram of a plan view of a surface of the optical component illustrated in FIG. 6 according to one embodiment.

FIG. 9 is a diagram of a plan view of the surface 56 of the optical component 46 illustrated in FIG. 6 according to one embodiment. The surface 56 includes a plurality of different portions 66-1-66-7, each of which has a particular filling fraction of sub-wavelength features based on the particular waveband of EMR 48 and corresponding different angles of incidence of EMR 48 impinging on the surface 56. Each portion 66 may represent a particular area of the optical component 46 through which the FPA 52 may receive EMR 48 when moved with respect to the optical component 46 by the gimbal 50. Each filling fraction can be determined using the principles discussed above with regard to FIG. 5.

Figure 10:
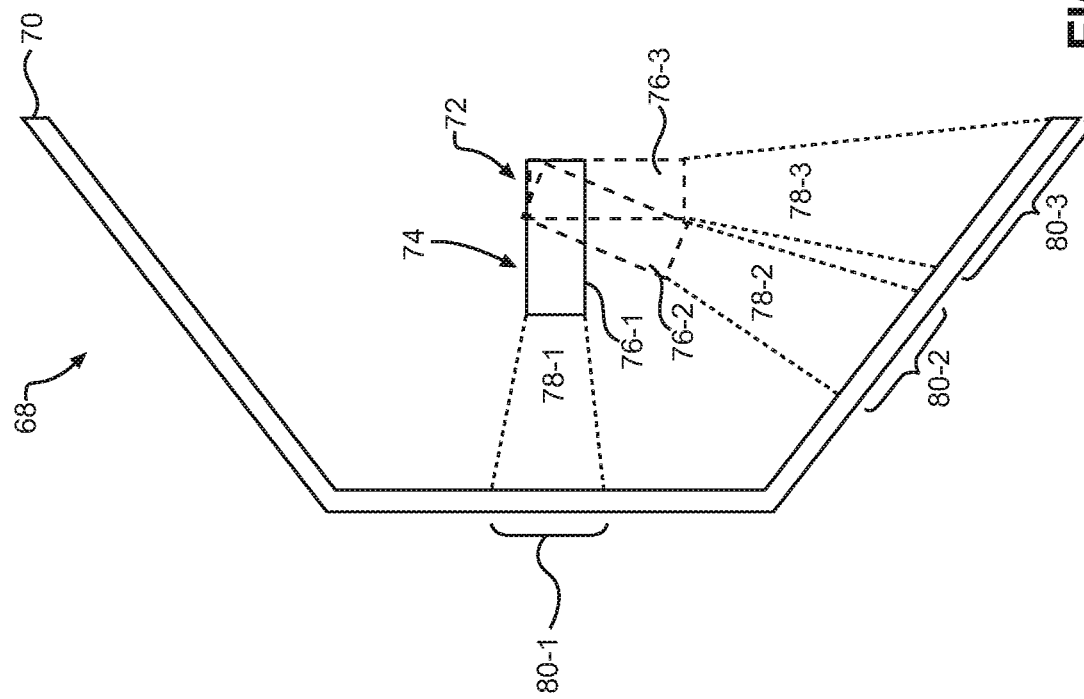
FIG. 10 is a diagram of a system according to another embodiment.

FIG. 10 is a diagram of a system 68 according to another embodiment. In this embodiment, an optical element 70 is non-planar, such as may be encountered in a window in an aircraft or missile. The optical element 70 may comprise any suitable substrate, such as glass, silicon, sapphire, or the like. A gimbal 72 moves a sensor 74 with respect to the optical element 70 to a plurality of positions 76-1-76-3, each of which has a corresponding FOV 78-1-78-3. While for purposes of illustration only three positions 76 are illustrated, it will be appreciated that in practice the gimbal 72 may move the sensor 74 with respect to the optical element 70 to tens or hundreds of different positions 76. Surface portions 80-1-80-3 each form a corresponding plurality of sub-wavelength openings that have a filling fraction that alters a native refractive index of the surface portions 80-1-80-3 to corresponding different refractive indices. Each surface portion 80-1-80-3 has a different index of refraction based in part on the angles of incidence of interest based on the FOVs 78-1-78-3.

Figure 11:
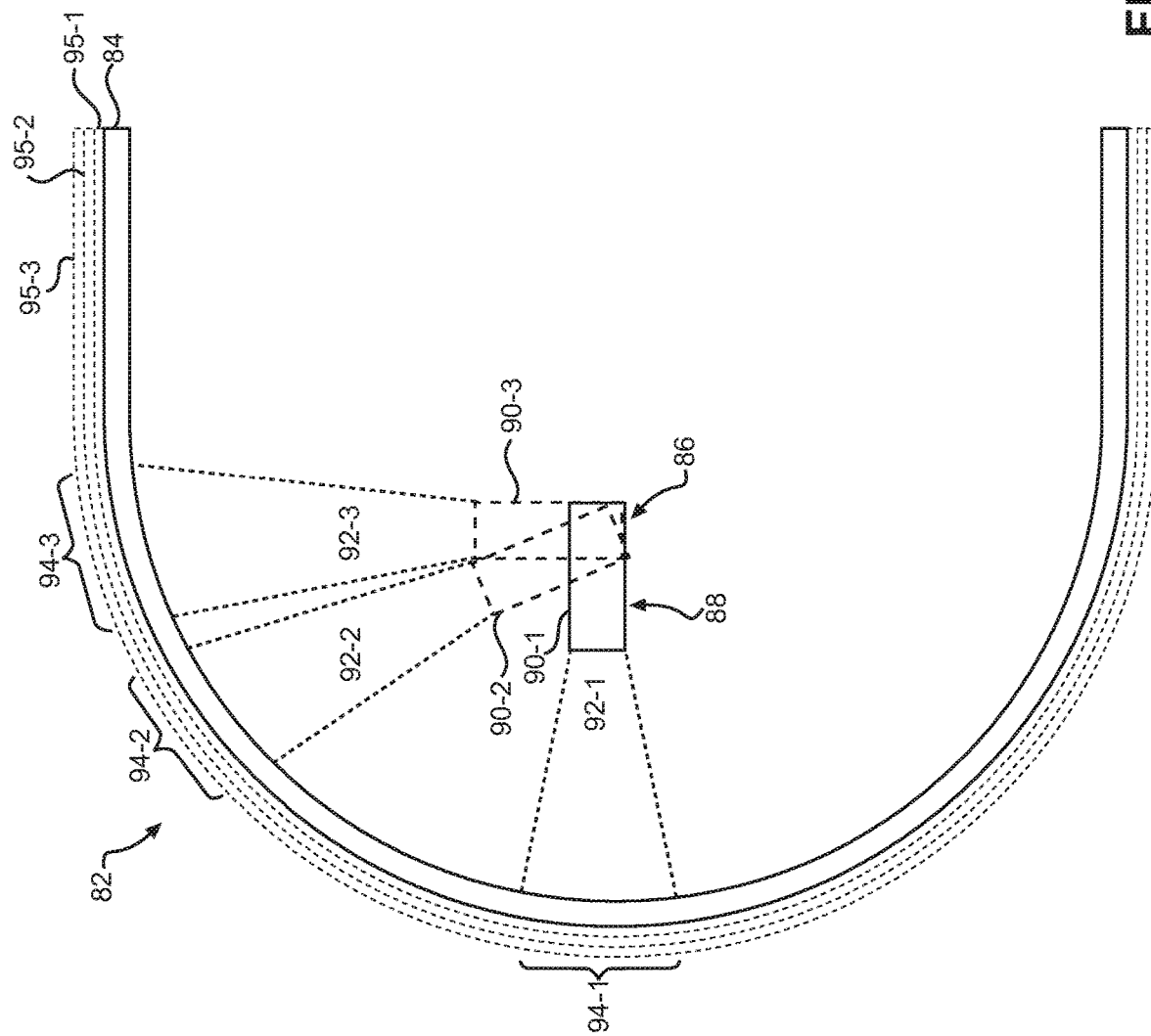
FIG. 11 is a diagram of a system according to another embodiment.

FIG. 11 is a diagram of a system 82 according to another embodiment. In this embodiment, an optical element 84 is non-planar, such as may be encountered in a window in an aircraft or missile. The optical element 84 may comprise any suitable substrate, such as glass, silicon, sapphire, or the like. A gimbal 86 moves a sensor 88, such as an FPA or the like, with respect to the optical element 84 to a plurality of positions 90-1-90-3, each of which provides a corresponding FOV 92-1-92-3. While for purposes of illustration only three positions 90 are illustrated, it will be appreciated that in practice the gimbal 86 may move the sensor 88 with respect to the optical element 84 to tens or hundreds of different positions 90. Surface portions 94-1-94-3 each form a corresponding plurality of sub-wavelength openings that have a filling fraction that alters a native refractive index of the surface portions 94-1-94-3 to corresponding different refractive indices. Each surface portion 94-1-94-3 has a different index of refraction based in part on the angles of incidence of interest based on the FOVs 92-1-92-3.

The embodiments discussed in FIGS. 6-11 may also include one or more layers of AR material, similar to those discussed above with regard to FIGS. 1-5. Thus, for example, the optical element 84 may include, for example, a first layer of AR material 95-1 having a low refractive index, such as silicon dioxide, a second layer of AR material 95-2 having a high refractive index, such as tantalum pentoxide, and a third, top layer of AR material 95-3 having a low refractive index, such as silicon dioxide. In such embodiments, the sub-wavelength openings would be formed in the top-most layer of AR material. The use of such alternating AR materials may increase the wavelength band of transmission.

Figure 12:
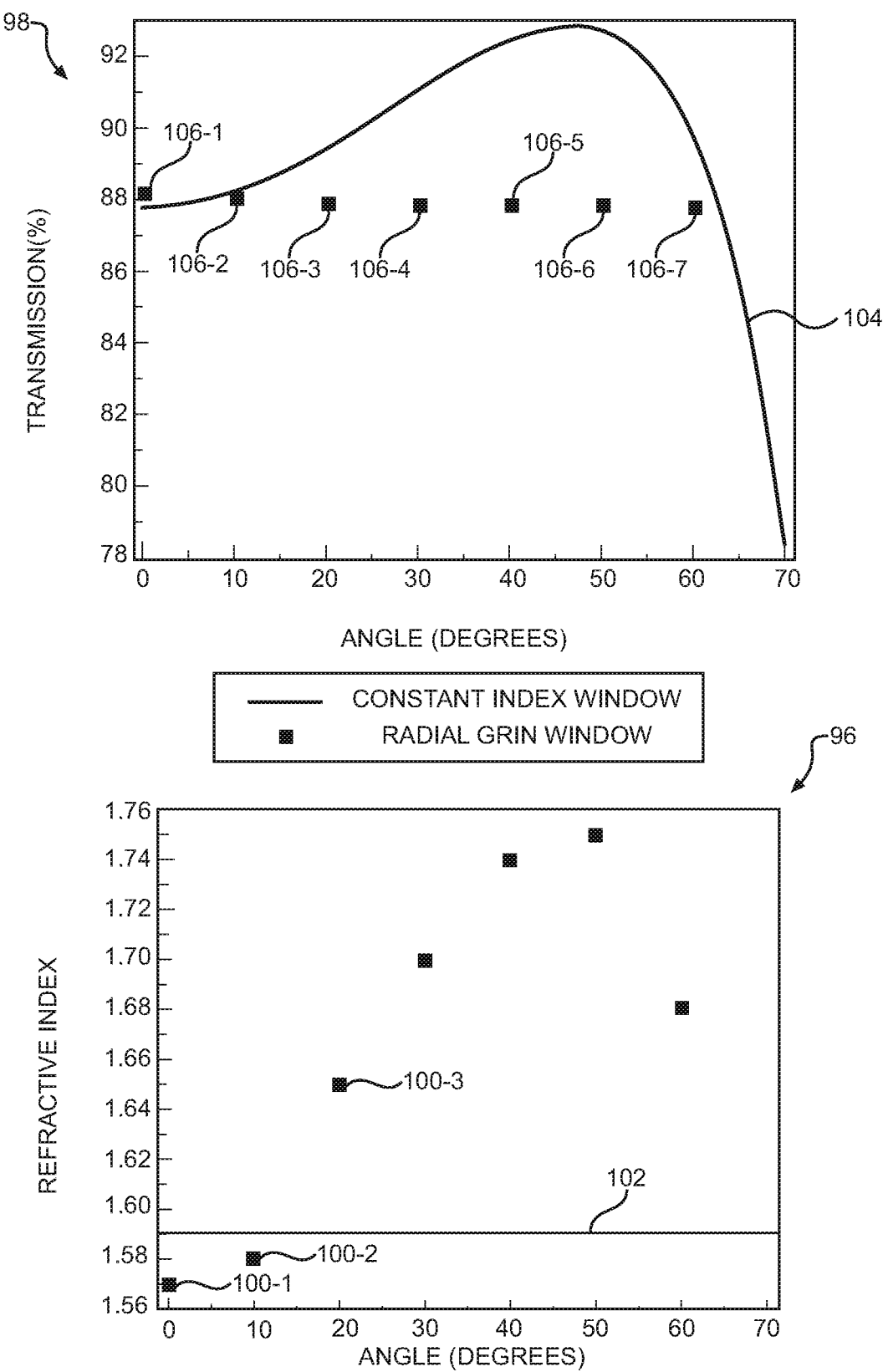
FIG. 12 illustrates two graphs that compare the performance of a first optical component with a constant refractive index, indicated by a solid line, to a second optical component that has multiple different refractive indices implemented in accordance with the teachings herein, indicated by square points.

FIG. 12 illustrates two graphs 96 and 98 comparing the performance of a first optical component with a constant refractive index, indicated by a solid line, to a second optical component that has multiple different refractive indices implemented in accordance with the teachings herein, indicated by square points. The data relates to a single wavelength, 3.7 µm, with an optical component that comprises a silicon substrate, for a steering array application, wherein a sensor, such as a FPA, is moved with respect to the optical component. In this example, the surface of the silicon substrate of the second optical component was altered to form a plurality of sub-wavelength openings, resulting in reduced reflectance (increased transmission) that is constant across a 120 degree (60 degree half angle) FOV. In this example, the filling fraction of the sub-wavelength openings is not homogenous across the silicon substrate to take into account the different angles of incidence of light based on the direction of the sensor.

The graph 96 identifies how the refractive index of the surface of the second optical component was changed based on angle of incidence. For example, a point 100-1 indicates that for an angle of incidence of 0 degrees, the surface was altered to have a refractive index of about 1.57. A point 100-2 indicates that for an angle of incidence of 10 degrees, the surface was altered to have a refractive index of about 1.58. A point 100-3 indicates that for an angle of incidence of 20 degrees, the surface was altered to have a refractive index of about 1.65. A solid line 102 identifies that the first optical component had a constant refractive index of about 1.59 across the entire first optical component.

The graph 98 identifies the transmissivity of the EMR (at a 3.7 µm wavelength) for both the first optical component and the second optical component. A solid line 104 indicates that the transmissivity of the first, constant refractive index optical component varied significantly from angles of incidence from 0 degrees to 60 degrees. A plurality of points 106-1-106-7 indicate that the transmissivity of the second optical component varied very little over the same angles of incidence, thus illustrating the effectiveness of the embodiments for a single wavelength.

Figure 13:
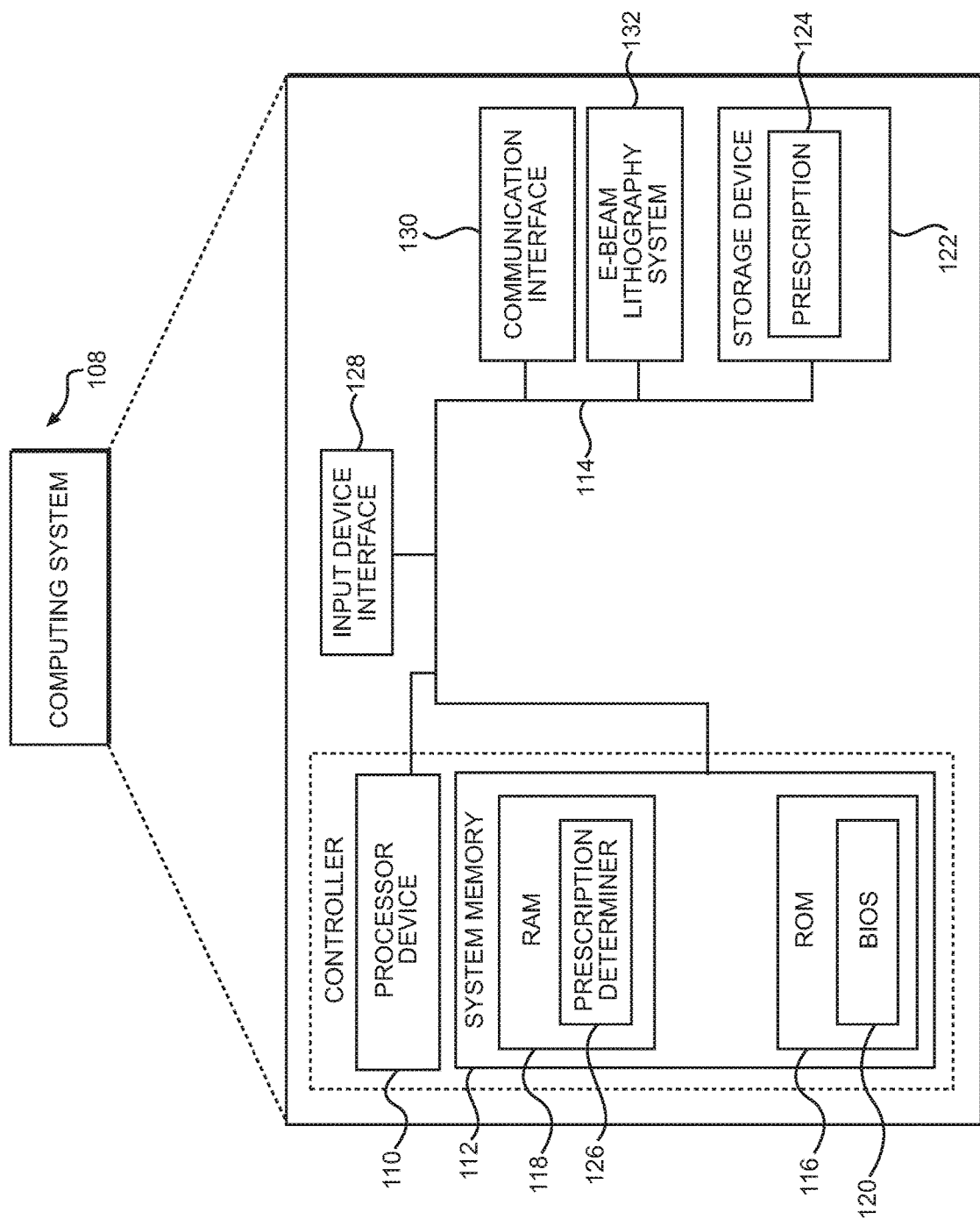
FIG. 13 is a block diagram of a system suitable for customizing the refractive index of a surface according to one embodiment.

FIG. 13 is a block diagram of a system 108 suitable for customizing the refractive index of a surface according to one embodiment. The system 108 may comprise one or more discrete computing or devices. The system 108 includes processor device 110, a system memory 112, and a system bus 114. The system bus 114 provides an interface for system components including, but not limited to, the system memory 112 and the processor device 110. The processor device 110 can be any commercially available or proprietary processor.

The system bus 114 may be any of several types of bus structures that may further interconnect to a memory bus (with or without a memory controller), a peripheral bus, and/or a local bus using any of a variety of commercially available bus architectures. The system memory 112 may include non-volatile memory 116 (e.g., read-only memory (ROM), erasable ROM (EPROM), electrically EPROM (EEPROM), etc.), and volatile memory 118 (e.g., RAM). A basic input/output system (BIOS) 120 may be stored in the non-volatile memory 116 and can include the basic routines that help to transfer information among elements within the system 108. The volatile memory 118 may also include a high-speed RAM, such as static RAM, for caching data.

The system 108 may further include or be coupled to a non-transitory computer-readable storage medium such as a storage device 122, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 122 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples. The storage device 122 may contain one or more prescriptions 124 that identify how a surface should be modified. For example, a prescription 124 may identify the particular filling fraction, diameter, and pitch of sub-wavelength openings that should be formed in the surface of an optical component, for each of a plurality of different surface portions of the optical component.

A number of modules can be stored in the storage device 122 and in the volatile memory 118, including a prescription determiner 126 that implements the mechanisms discussed above with respect to FIG. 5 to determine a prescription 124. All or a portion of the examples may be implemented as a computer program product stored on a transitory or non-transitory computer-usable or computer-readable storage medium, such as the storage device 122, which includes complex programming instructions, such as complex computer-readable program code, to cause the processor device 110 to carry out the steps described herein. Thus, the computer-readable program code can comprise software instructions for implementing the functionality of the examples described herein when executed on the processor device 110. The processor device 110 may serve as a controller, or control system, for the system 108 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 110 through an input device interface 128 that is coupled to the system bus 114 but can be connected by other interfaces, such as a parallel port, a serial port, a Universal Serial Bus (USB) port, an IR interface, and the like.

The system 108 may also include a communication interface 130 suitable for communicating with a network as appropriate or desired. The system 108 may also include an e-beam lithography system 132 suitable for accessing a prescription 124 and, in accordance with the prescription 124, form a plurality of sub-wavelength openings in a surface of an optical component to alter one or more portions of the surface from a native refractive index to a desired refractive index.

Those skilled in the art will recognize improvements and modifications to the preferred embodiments of the disclosure. All such improvements and modifications are considered within the scope of the concepts disclosed herein and the claims that follow.

What is claimed is:

1. A method for customizing a refractive index of a surface comprising:
    forming a plurality of first sub-wavelength openings at a first filling fraction in a first portion of a surface of an optical component to change a native refractive index of the surface of the optical component from the native refractive index to a first desired refractive index based at least in part on a desired transmissivity of the first portion; and
    forming a plurality of second sub-wavelength openings at a second filling fraction in a second portion of the surface of the optical component to change the native refractive index of the surface of the optical component from the native refractive index to a second desired refractive index based at least in part on a desired transmissivity of the second portion.

2. The method of claim 1 wherein the optical component comprises an optical substrate, and the surface comprises a surface of the optical substrate.

3. The method of claim 2 further comprising applying a first layer of anti-reflective (AR) material on the optical substrate, and wherein the surface comprises a surface of the first layer of AR material.

4. The method of claim 2 further comprising:
    applying a first layer of anti-reflective (AR) material on the optical substrate;
    applying a second layer of AR material over the first layer of AR material; and
    wherein the surface comprises a surface of the second layer of AR material.

5. The method of claim 4 wherein the first layer of AR material has a native refractive index of less than 1.5.

6. The method of claim 2 further comprising:
    applying a first layer of AR material on the optical substrate;
    applying a second layer of AR material over the first layer of AR material;
    applying a third layer of AR material over the second layer of AR material; and
    wherein the surface comprises a surface of the third layer of AR material.

7. The method of claim 6 wherein the third layer of AR material has a native refractive index of less than 1.5, the first layer of AR material has a native refractive index of less than 1.5, and the second layer of AR material has a native refractive index of greater than 1.5.

8. The method of claim 1 further comprising:
    determining the first desired refractive index of the first portion of the surface of the optical component for a particular wavelength band of electromagnetic radiation (EMR) and a first angle of incidence of the particular wavelength band of EMR impinging on the first portion of the surface of the optical component; and
    based on the first desired refractive index, determining the first filling fraction of the plurality of first sub-wavelength openings to alter the first portion of the surface to change the native refractive index to the first desired refractive index.

9. The method of claim 8 wherein determining the first filling fraction of the plurality of first sub-wavelength openings comprises determining a diameter D of the first sub-wavelength openings and an opening pitch L that identifies a distance between the first sub-wavelength openings.

10. The method of claim 9, wherein determining the diameter D of the first sub-wavelength openings and the opening pitch L that identifies the distance between the first sub-wavelength openings further comprises:
    determining the diameter D of the first sub-wavelength openings and the opening pitch L that identifies the distance between the first sub-wavelength openings substantially in accordance with the following equation:

$$n_{eff} = n_{low} + \frac{\pi D^2}{2\sqrt{3} L^2}(n_{air} - n_{low})$$

wherein $n_{eff}$ is the first desired refractive index, $n_{low}$ is the native refractive index of the surface, $n_{air}$ is a refractive index of air, D is the diameter of the first sub-wavelength openings and L is the opening pitch that identifies the distance between the first sub-wavelength openings.

11. The method of claim 8 further comprising:
    determining the second desired refractive index of the second portion of the surface of the optical component for the particular wavelength band of EMR and a second angle of incidence of the particular wavelength band of EMR impinging on the second portion of the surface of the optical component; and
    based on the second desired refractive index, determining the second filling fraction of the plurality of second sub-wavelength openings to alter the second portion of the surface to change the native refractive index to the second desired refractive index.

12. The method of claim 8 further comprising determining a plurality of different desired refractive indices at a plurality of corresponding portions of the surface of the optical component for the particular wavelength band of EMR and corresponding different angles of incidence of the particular wavelength band of EMR impinging on the surface at the corresponding portions of the surface; and
    for each corresponding portion of the surface:
        determining a corresponding filling fraction of a corresponding plurality of sub-wavelength openings that alters the corresponding portion of the surface to change the native refractive index of the surface to a desired different refractive index; and
        forming the corresponding plurality of sub-wavelength openings at the corresponding filling fraction in the corresponding portion of the surface.

13. The method of claim 1 further comprising determining the first desired refractive index of the first portion of the surface of the optical component for a particular wavelength band of EMR and a range of angles of incidence of the particular wavelength band of EMR impinging on the surface of the optical component at the first portion of the top layer of AR material; and
    based on the first desired refractive index, determining a filling fraction of a plurality of sub-wavelength openings that alters the first portion of the surface of the optical component from the native refractive index of the surface of the optical component to the first desired refractive index.

14. A system comprising:
an optical component comprising:
a surface comprising:
a first portion that forms a plurality of first sub-wavelength openings at a first filling fraction that changes a native refractive index of the surface to a first desired refractive index based at least in part on a desired transmissivity of the first portion; and
a second portion that forms a plurality of second sub-wavelength openings at a second filling fraction that changes the native refractive index of the surface to a second desired refractive index based at least in part on a desired transmissivity of the second portion.

15. The system of claim 14 wherein the optical component comprises an optical substrate, and the surface comprises a surface of the optical substrate.

16. The system of claim 14 wherein the optical component comprises an optical substrate and a first layer of anti-reflective (AR) material, and the surface comprises a surface of the first layer of AR material.

17. The system of claim 14 wherein the optical component comprises an optical substrate, a first layer of AR material, and a second layer of AR material having an index of refraction different from an index of refraction of the first layer of AR material, and wherein the surface comprises a surface of the second layer of AR material.

18. The system of claim 14 wherein the optical component comprises an optical substrate, a first layer of AR material, a second layer of AR material having an index of refraction different from an index of refraction of the first layer of AR material, and a third layer of AR material having an index of refraction different from the index of refraction of the second layer of AR material, and wherein the surface comprises a surface of the third layer of AR material.

19. The system of claim 18 wherein the optical component is non-planar.

20. The system of claim 14 further comprising an image sensor fixed with respect to the optical component, the image sensor configured to receive electromagnetic radiation (EMR) received through the optical component.

21. The system of claim 20 further comprising a gimbal configured to cause EMR received from a plurality of different fields of view to be directed toward the optical component for transmission through the optical component to the image sensor.

22. A method for customizing a refractive index of a surface comprising:
providing an optical component having a first side and a second side;
forming a plurality of first sub-wavelength openings at a first filling fraction in a first portion of a surface of the first side of the optical component based in part on a determined first direction of a sensor directed toward the second side of the optical component to change a native refractive index of the surface of the optical component from the native refractive index to a first desired refractive index to alter a transmissivity of light incident on the first portion that passes through the optical component and exits the second side in the determined first direction toward the sensor; and
forming a plurality of second sub-wavelength openings at a second filling fraction in a second portion of the surface of the first side of the optical component based in part on a determined second direction of the sensor directed toward the second side of the optical component to change the native refractive index of the surface of the optical component from the native refractive index to a second desired refractive index to alter a transmissivity of light incident on the second portion that passes through the optical component and exits the second side in the determined second direction toward the sensor.

* * * * *